G. S. BOICE.
Tooth-Pick.
No. 167,733. Patented Sept. 14, 1875.
Fig: 1.
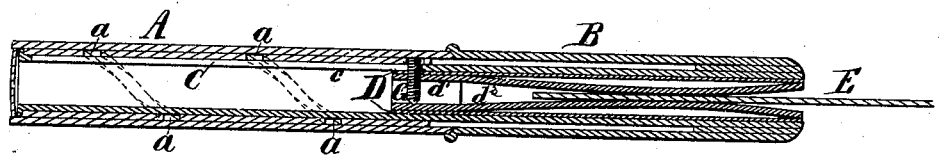
Fig: 2.
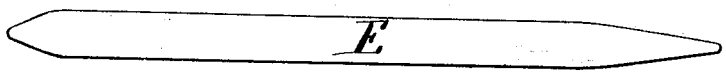
Witnesses: Inventor:
G. S. Boice
by his attorney

UNITED STATES PATENT OFFICE.

GARRET S. BOICE, OF JERSEY CITY, NEW JERSEY.

IMPROVEMENT IN TOOTH-PICKS.

Specification forming part of Letters Patent No. 167,733, dated September 14, 1875; application filed June 14, 1875.

*To all whom it may concern:*

Be it known that I, GARRET S. BOICE, of Jersey City, in Hudson county, in the State of New Jersey, have invented certain new and useful Improvements Relating to Tooth-Picks, of which the following is a specification:

The thinness and great strength and elasticity of pieces of quill eminently adapt them to serve for tooth-picks. I have devised a new holder whereby such may be used with great convenience and cleanliness.

The exterior of my holder is of precious metal, or other rich material on the surface, in two lengths, with an internal piece which is protruded and retracted by the revolving of one of the external parts relatively to the other. The internal piece is provided with springs adapted to fit tightly to and firmly hold a piece of quill, which serves as the tooth-pick proper.

The accompanying drawing forms a part of this specification, and represents what I consider the best means of carrying out the invention.

Figure 1 is a central longitudinal section representing my tooth-pick holder and tooth-pick in an extended condition. Fig. 2 is a face view of the quill tooth-pick removed.

Referring to the drawing, A is one part of the external case, and B is another, capable of revolving thereon. The interior of the part A is grooved with a spiral or helical recess, $a$. To the part B is firmly attached a long internal tube, C, which extends the length of A and B, and is headed or flanged outward at the rear end to engage in a corresponding recess, and hold the parts together. The tube C has a long straight slot, $c$. D is a shorter tube, fitted loosely inside of the part C, and provided with two strong springs, $d^1$ $d^2$, soldered at each end to the interior of the tube D, and adapted to take a firm hold on the tooth-pick E all along the middle of their length. G is a screw-pin, tapped through the tube D, and through one or both the springs $d^1$ $d^2$, so as to take a firm hold of the part D and its contents. Its outer end extends through the straight slot $c$, and is received in the helical groove $a$. The quill E, being forcibly thrust into the space between the bellies of the springs $d^1$ $d^2$, is firmly retained by the pressure of the stiffly-supported springs, and, being allowed to protrude to a proper extent, serves its ordinary functions.

On revolving the part B on the part A, the slot $c$ compels the internal part D to turn around with it; and by the action of the spiral groove $a$ on the pin G, draws inward the part D and the attached tooth-pick E. Revolving in the opposite direction thrusts the tooth-pick immediately out, and renders it available for its ordinary uses.

My tooth-pick holder may hold suitable pieces adapted to serve in the manner described, which may be other than quill. I propose especially to use rubber and whalebone. I believe I can use these materials successfully, as also probably ivory, and perhaps some metals; but for ordinary uses I believe quill will generally be preferred. It should be as long as will be entirely concealed when first inserted. As the end becomes frayed and destroyed, it may be partially drawn out by force from between the springs $d^1$ $d^2$, and the worn end may then be repointed.

It may be formed with a point at each end, as shown in Fig. 2, if preferred, and may be reversed when worn out.

I claim as my invention—

The curved springs $d^1$ $d^2$, set as shown, in the movable tube D, and inclosed within the parts A B C, so as to be thrust out and withdrawn at pleasure, as specified.

In testimony whereof I have hereunto set my hand.

GARRET S. BOICE.

Witnesses:
WM. C. DEY,
HENRY GENTNER.